US008405861B2

(12) United States Patent
Kobayashi et al.

(10) Patent No.: US 8,405,861 B2
(45) Date of Patent: Mar. 26, 2013

(54) INFORMATION PROCESSING APPARATUS, DEVICE OPERATION SETTING METHOD AND RECORDING MEDIUM

(75) Inventors: Minako Kobayashi, Ikeda (JP); Takehisa Yamaguchi, Ikoma (JP); Katsuhiko Akita, Amagasaki (JP); Kazuya Anezaki, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 327 days.

(21) Appl. No.: 12/841,425

(22) Filed: Jul. 22, 2010

(65) Prior Publication Data

US 2011/0019232 A1  Jan. 27, 2011

(30) Foreign Application Priority Data

Jul. 27, 2009  (JP) ................. 2009-174810

(51) Int. Cl.
G06F 15/00 (2006.01)
G06F 3/00 (2006.01)
(52) U.S. Cl. .......................... 358/1.15; 710/8
(58) Field of Classification Search .................. 358/1.15
See application file for complete search history.

(56) References Cited

U.S. PATENT DOCUMENTS

| 5,625,757 | A | 4/1997 | Kageyama et al. |
| 2003/0079063 | A1* | 4/2003 | Iida et al. ..................... 710/8 |
| 2004/0205743 | A1 | 10/2004 | Sugahara |
| 2005/0134889 | A1 | 6/2005 | Nakazawa |
| 2006/0103868 | A1 | 5/2006 | Mitsui |
| 2007/0216944 | A1 | 9/2007 | Furuya |

FOREIGN PATENT DOCUMENTS

| EP | 0 977 113 A2 | 2/2000 |
| JP | 2001-236298 | 8/2001 |
| JP | 2003-167714 A | 6/2003 |
| JP | 2004-126940 | 4/2004 |
| JP | 2005-153418 | 6/2005 |
| JP | 2006-164240 A | 6/2006 |
| JP | 2007-249856 | 9/2007 |

OTHER PUBLICATIONS

Office Action (Notification of Reasons for Refusal) dated Jun. 7, 2011, issued in the corresponding Japanese Patent Application No. 2009-174810, and an English Translation thereof.
The extended European Search Report dated Jan. 12, 2012, issued in corresponding European Patent Application No. 10170755.2. (16 pages).

* cited by examiner

*Primary Examiner* — Saeid Ebrahimi Dehkordy
(74) *Attorney, Agent, or Firm* — Buchanan Ingersoll & Rooney PC (57) ABSTRACT

An information processing apparatus has a first device driver and a second device driver installed thereon to use a first device and a second device, respectively. When the first device driver is activated, an operation setting screen to perform operation setting for the first device is displayed on a display portion. If a user changes the target device from the first device to the second device while performs operation setting via the operation setting screen, the second device driver for the second device takes over a value set using the first device driver and recorded in a memory.

24 Claims, 10 Drawing Sheets

INFORMATION PROCESSING APPARATUS, DEVICE OPERATION SETTING METHOD AND RECORDING MEDIUM

This application claims priority under 35 U.S.C. §119 to Japanese Patent Application No. 2009-174810 filed on Jul. 27, 2009, the entire disclosure of which is incorporated herein by reference in its entirety.

BACKGROUND OF THE INVENTION

1. Field of the Invention

The present invention relates to an information processing apparatus having a device driver installed thereon to use a device such as a MFP (Multi Function Peripheral) that is a copier, a printer or a multifunctional digital image forming apparatus collectively having the copy function, the print function, the scan function and other functions, a device operation setting method, and a computer readable recording medium having a device operation setting program recorded therein to make a computer execute processing.

2. Description of the Related Art

The following description sets forth the inventor's knowledge of related art and problems therein and should not be construed as an admission of knowledge in the prior art.

There exists a commonly used information processing system, in which a plurality of devices such as MFPs like that described above and an information processing apparatus that is a personal computer are interconnected via a network. And a user can make a preferable device perform printing, by transmitting thereto a print job and etc. from the information processing apparatus.

In this information processing system, a device driver to use a device, such as a printer driver, is installed in advance on the information processing apparatus.

A user selects and activates a device driver for the target device, then an operation setting screen (for example, a print setting screen) is opened according to the device driver. And the user performs operation setting via the operation setting screen and gives a job execution instruction, then a created job is transmitted to the target device and executed by the target device.

While performs operation setting via the operation setting screen displayed according to the device driver, the user may feel like changing the target device in the following cases.

For example, in the case where the user in a hurry for printing finds that the target MFP is now busy making so many copies, and in the case where the user receives a notice of the occurrence of a paper jam from the target MFP while performs print setting. Furthermore, also in the case where the user performs operation setting using a Twain driver and comes to the target MFP to set a document on its scanner and make it perform scanning by Twain, however, the user had to set a document on a different MFP's scanner since the target MFP is currently used by another user.

Like in such a case, in order to change the target device while performs operation setting via an operation setting screen displayed according to a device driver for the target device, the user had to close the operation setting screen; select a different driver; opens an operation setting screen according to the different driver; and performs operation setting via the operation setting screen again. This is troublesome for the user.

According to Japanese Unexamined Laid-open Patent Publication No. 2006-164240, there exists a data processing apparatus that is capable of detecting a mismatch between a print setting of an application and a function set using a printer driver and automatically adjusting the print setting to resolve the mismatch.

According to Japanese Unexamined Laid-open Patent Publication No. 2003-167714, there exists a user interface display apparatus that is capable of keeping a space large enough for dialog boxes for setting, and allowing users to check in an easy manner, present values set for respective setting items, not requiring them set values for respective setting items via boxes that are switched on the display one by one.

The technology described in Japanese Unexamined Laid-open Patent Publication No. 2006-164240 can resolve a mismatch between a print setting of an application and a function set using a printer driver for the target device, but cannot resolve the inconvenience that users have to perform operation setting again if they change the target device while performs operation setting via an operation setting screen displayed according to the device driver.

Also, the technology described in Japanese Unexamined Laid-open Patent Publication No. 2003-167714 cannot resolve the inconvenience that users have to perform operation setting again if they change the target device.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an information processing apparatus that improves the usefulness by resolving the inconvenience that users have to perform operation setting again using a device driver if they change the target device from the device driver to a different device driver while performs operation setting via an operation setting screen displayed according to the different device driver.

It is another object of the present invention to provide a device operation setting method that improves the usefulness by resolving the inconvenience that users have to perform operation setting again using a device driver if they change the target device from the device driver to a different device driver while performs operation setting via an operation setting screen displayed according to the different device driver.

It is yet another object of the present invention to provide a computer readable recording medium having a device operation setting program recorded therein to make a CPU of the information processing apparatus execute an operation setting process.

According to a first aspect of the present invention, an information processing apparatus having a first device driver and a second device driver installed thereon to use a first device and a second device, respectively, includes:

a display portion that displays on itself, an operation setting screen to perform operation setting for the first device, when the first device driver is activated;

a memory that records in itself, a value set via the operation setting screen displayed on the display portion; and a controller that makes the second device driver for the second device, take over the value recorded in the memory and set using the first device driver, if a user changes the target device from the first device to the second device while performs operation setting via the operation setting screen.

According to a second aspect of the present invention, a device operation setting method implemented by an information processing apparatus having a first device driver and a second device driver installed thereon to use a first device and a second device, respectively, includes:

displaying on a display portion, an operation setting screen to perform operation setting for the first device, when the first device driver is activated;

recording in a memory, a value set via the operation setting screen displayed on the display portion; and making the second device driver for the second device, take over the value recorded in the memory and set using the first device driver, if a user changes the target device from the first device to the second device while performs operation setting via the operation setting screen.

According to a third aspect of the present invention, a computer readable recording medium has a device operation setting program recorded therein to make a CPU of an information processing apparatus having a first device driver and a second device driver installed thereon to use a first device and a second device, respectively, execute:

displaying on a display portion, an operation setting screen to perform operation setting for the first device, when the first device driver is activated;

recording in a memory, a value set via the operation setting screen displayed on the display portion; and making the second device driver for the second device, take over the value recorded in the memory and set using the first device driver, if a user changes the target device from the first device to the second device while performs operation setting via the operation setting screen.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
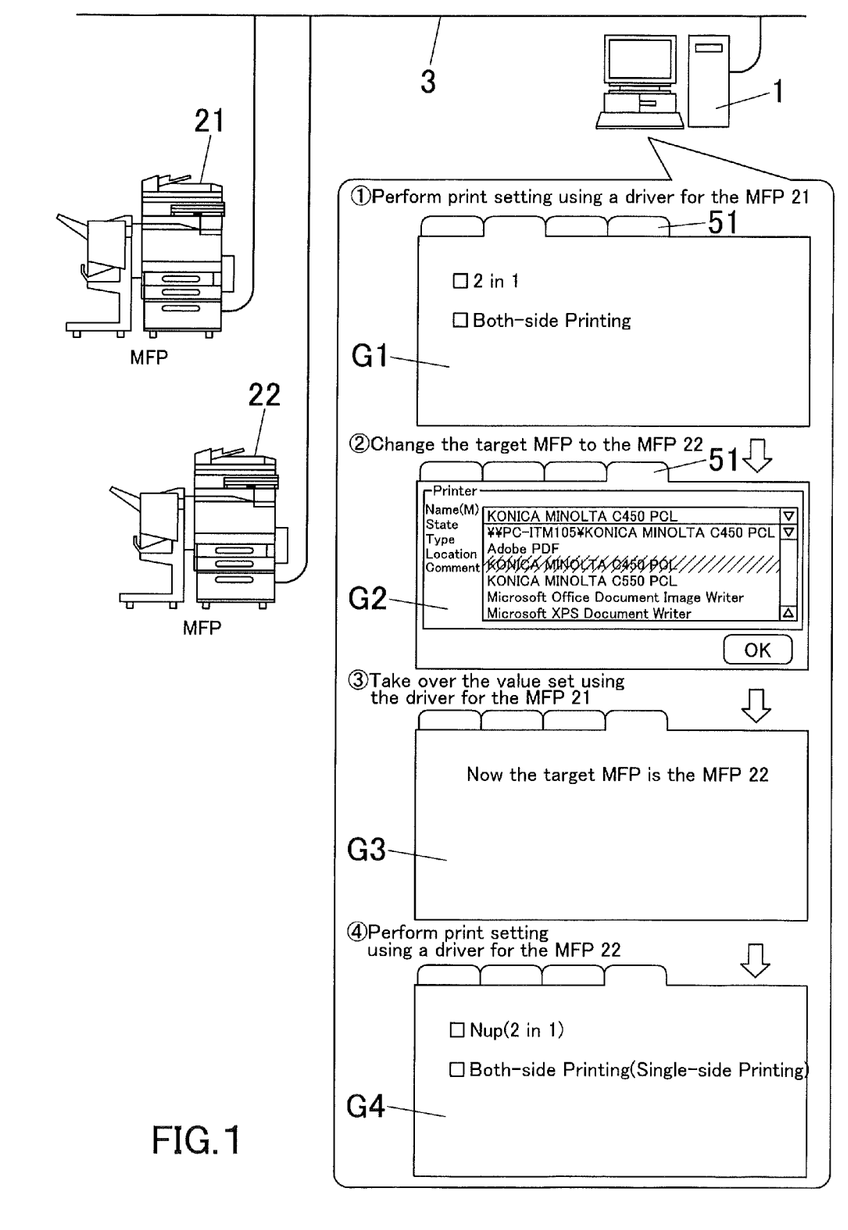
FIG. 1 is a block diagram showing a configuration of an image processing system in which an information processing apparatus according to one embodiment of the present invention is employed.

FIG. 1 is a block diagram showing a configuration of an image processing system in which an information processing apparatus according to one embodiment of the present invention is employed.

This image processing system includes an information processing apparatus 1, and MFPs 21 and 22 each serving as a device as described above, and these are interconnected via a network 3.

The information processing apparatus 1 is a personal computer. A configuration of the information processing apparatus 1 will be illustrated in a block diagram shown in FIG. 2.

Figure 2:
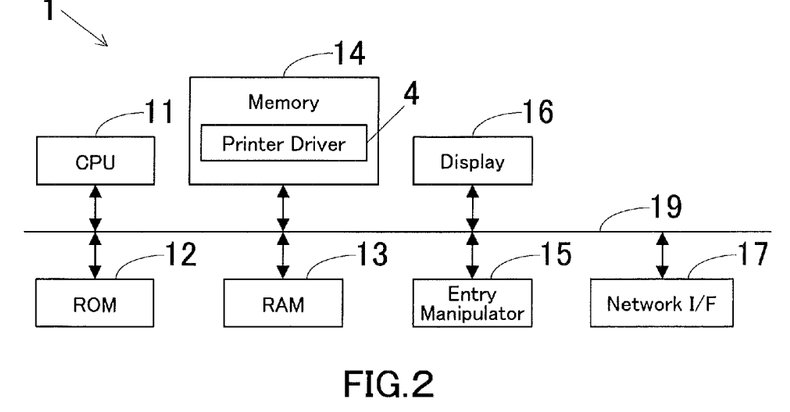
FIG. 2 is a block diagram schematically showing a configuration of the information processing apparatus.

As shown in FIG. 2, the information processing apparatus 1 includes a CPU 11, a ROM 12, a RAM 13, a memory 14, an entry manipulator 15, a display 16, a network interface (network I/F) 17 and etc., and these are interconnected via a system bus 19.

The CPU 11 centrally controls the entire information processing apparatus 1 by executing a program recorded in the ROM 12 or the memory 14.

The ROM 12 is a recording medium that records in itself a program executed by the CPU 11 and other data.

The RAM 13 is a recording medium that provides a word area for the CPU 11 to execute processing according to an operation program.

The memory 14 is a recording medium such as a hard disk drive (HDD), and records in itself various application programs, data and etc. In this embodiment, the memory 14 records printer drivers 4 serving as device driver software for the image forming apparatuses 21 and 22, and scanner drivers for scanners of the image forming apparatuses 21 and 22. By activating a printer driver or a scanner driver, users can give a job to print or read a document, for example, to the image forming apparatus 21 or 22 suitable for the activated driver.

The entry manipulator 15 includes a keyboard, a mouse and etc., and is used by users for entry manipulation.

The display 16 is a CRT, a liquid crystal display or etc. and displays on itself, a print setting screen according to a printer driver, a scan setting screen according to a scanner driver, various messages, an entry reception screen, a selection screen and other screens, and documents and others created by users.

The network interface 17 functions as a communicator that exchanges data with the image forming apparatuses 21 and 22 and other external devices, via the network 3. In this embodiment, the network interface 17 transmits to the image forming apparatuses 21 and 22, values set via an operation setting screen displayed according to a printer driver, a scanner driver or another driver, an operation request and etc.

Figure 3:
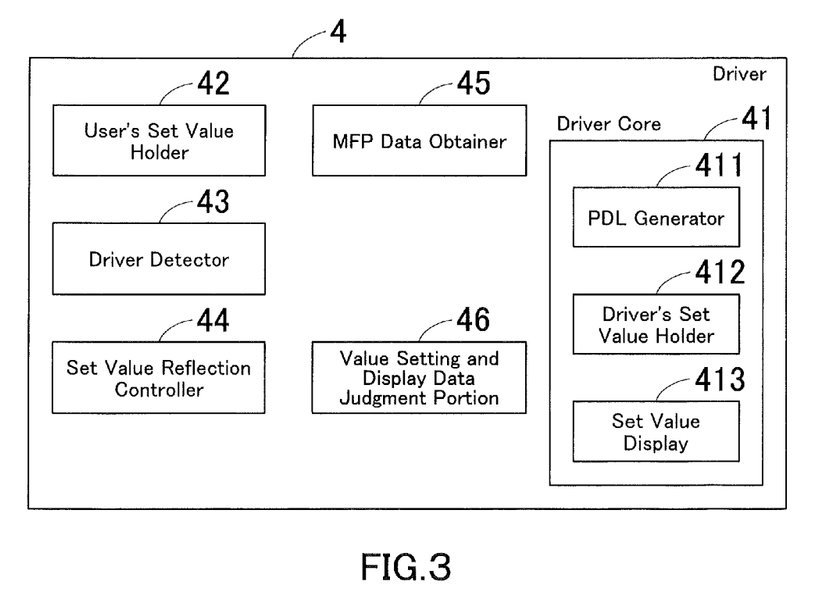
FIG. 3 is a block diagram showing a functional configuration of a printer driver recorded in a memory.

FIG. 3 is a block diagram showing a functional configuration of the printer driver 4 recorded in the memory 14. Since the printer drivers 4 for the MFPs 21 and 22 have a common functional configuration, either of them will be explained on behalf. The scanner drivers for the MFPs 21 and 22 have a similar functional configuration.

The printer driver 4 includes a driver core 41, a user's set value holder 42, a driver detector 43, a set value reflection controller 44 used when the target driver is changed, a MFP data obtainer 45 and a value setting and display data judgment portion 46 used when the target driver is changed.

The driver core 41 includes a PDL generator 411, a driver's set value holder 412 and a set value display 413.

The PDL generator 411 generates a description in a page description language (PDL) for the MFP 21 or 22 to print a target document or image. The driver's set value holder 412 records in itself, data of an operation setting screen displayed according to a printer driver, default set values and other data. Actually, it is a recording medium such as the memory 14. The set value display 413 displays on itself, an operation setting screen on the display 16, and displays operation values entered by users (hereinafter also will be referred to as "set values", simply) in the operation setting screen.

The user's set value holder 42 records in itself values set by users. Actually, it is a recording medium such as the memory 14.

The driver detector 43 detects available MFPs (drivers) if a user changes the target MFP (driver) while performs operation setting.

If the target MFP (driver) is changed, the set value reflection controller 44 makes a second driver which is after changing take over the values that are set using a first driver which is before changing and recorded in the user's set value holder 42.

The MFP data obtainer 45 obtains data from the MFPs 21 or 22 suitable for the target printer driver to reflect to the target printer driver.

The value setting and display data judgment portion 46 judges whether or not a user changes the target MFP (driver) and also determines data to be outputted in an operation setting screen displayed according to a second driver. In this embodiment, the set values taken over from a first driver to a second driver are displayed on the display 16 so that users can recognize, or a difference in configurable functions between the MFPs 21 and 22 are displayed on the display 16 so that users can recognize.

Figure 4:
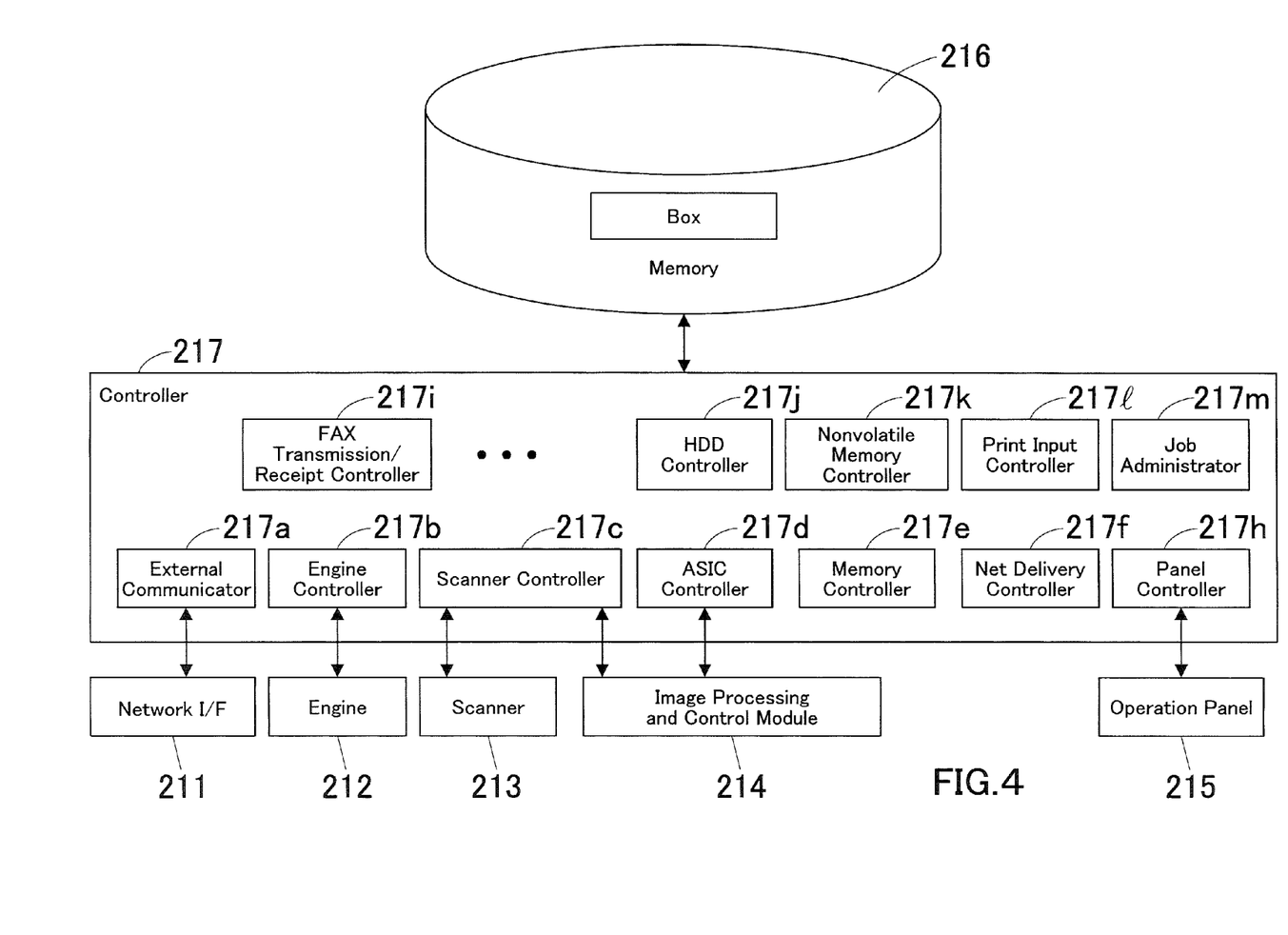
FIG. 4 is a block diagram showing a functional configuration of a MFP.

FIG. 4 is a block diagram showing a functional configuration of the MFP 21. Hereinafter, since the MFPs 21 and 22 have a common functional configuration, the MFP 21 will be explained on behalf.

As shown in FIG. 4, the MFP 21 includes a network interface (network I/F) 211, an engine 212, a scanner 213, an image processing and control module 214, an operation panel 215, a memory 216, a controller 217 and etc.

The network interface 211 serves to communicate with the information processing apparatus 1 via the network 3.

The engine 212 prints out on paper document data or other data, and image data read out from a document by the scanner 213, according to a job received from the information processing apparatus 1.

The scanner 213 reads an image of a document placed on a document table.

The image processing and control module 214 performs image processing in a predetermined manner before printing image data read out from a document by the scanner 213.

The operation panel 215 includes a key entry portion having a numeric key pad, a start key and other keys, and a display such as a liquid crystal display (these are not shown in Figure). The operation panel 215 is used by users for a user login operation, various entry operations and other operations, and also displays on itself an operating state of the MFP, a mode, a message for users and etc.

The memory 216 records in itself image data read out from a document by the scanner 213, data of a target document received from the information processing apparatus 1, and other data. The memory 216 is a hard disk drive (HDD) for example and holds one or more than one memory area that is called as "Box". Some of them are private Boxes provided for individual users and some of them are shared Boxes allowing only group members to access or no limiting accesses from any users.

The controller 217 includes an external communicator 217a that is capable of communicating with external devices such as the MFPs 21 and 22 on the network 3, via the network interface 211, an engine controller 217b, a scanner controller 217c, an ASIC (Application Specific Integrated Circuit) controller 217d that controls the image processing and control module 214, a memory controller 217e, a net delivery controller 217f, a panel controller 217h that controls the operation panel 215, a FAX transmission/receipt controller 217i that controls operations about FAX transmission and receipt, a HDD controller 217j that controls the memory 216, a nonvolatile memory controller 217k that controls a nonvolatile memory not shown in Figure, a print input controller 217l, a job administrator 217m and etc. The controller 217 includes a CPU, a ROM, a RAM and etc. not shown in Figure.

Hereinafter, an overview of basic operations to perform operation setting using a printer driver for the MFP 21 or 22, installed on the information processing apparatus 1, will be explained.

As shown in FIG. 1, a user performs print setting via a print setting screen G1 displayed according to a printer driver for the MFP 21 (Circled Number 1 in FIG. 1). In this example, the user sets the values: "2 in 1" to print 2 pages in 1 sheet and "both-side printing".

While performs print setting, the user presses a MFP cooperation tab 51 via the print setting screen to display a device selection screen G2, and then selects the MFP 22 via the screen (Circled Number 2 in FIG. 1). The selected MFP 22 is indicated by shadow in the device selection screen G2.

And a screen G3 showing the message "the target MFP is changed to the MFP 22" is displayed (Circled Number 3 in FIG. 1), and then a print setting screen G4 is displayed according to a printer driver for the MFP 22 (Circled Number 4 in FIG. 1). As shown in the print setting screen G4, the values set using the printer driver for the MFP 21: "2 in 1" and "both-side printing" are taken over.

As described above, if a user changes the target MFP from the MFP 21 to the MFP 22 while performs print setting via a print setting screen that is displayed on the display 16 when a printer driver for the MFP 21 is activated, a printer driver for the MFP 22 takes over the values that are set using the printer driver for the MFP 21 and recorded in the memory 14. And thus, the user does not have to perform operation setting again for the MFP 22, which makes operation easier.

Hereinafter, a procedure executed in the information processing apparatus 1 will be further described with reference to a flowchart shown in FIG. 5. In this example, the device drivers are printer drivers.

Figure 5:
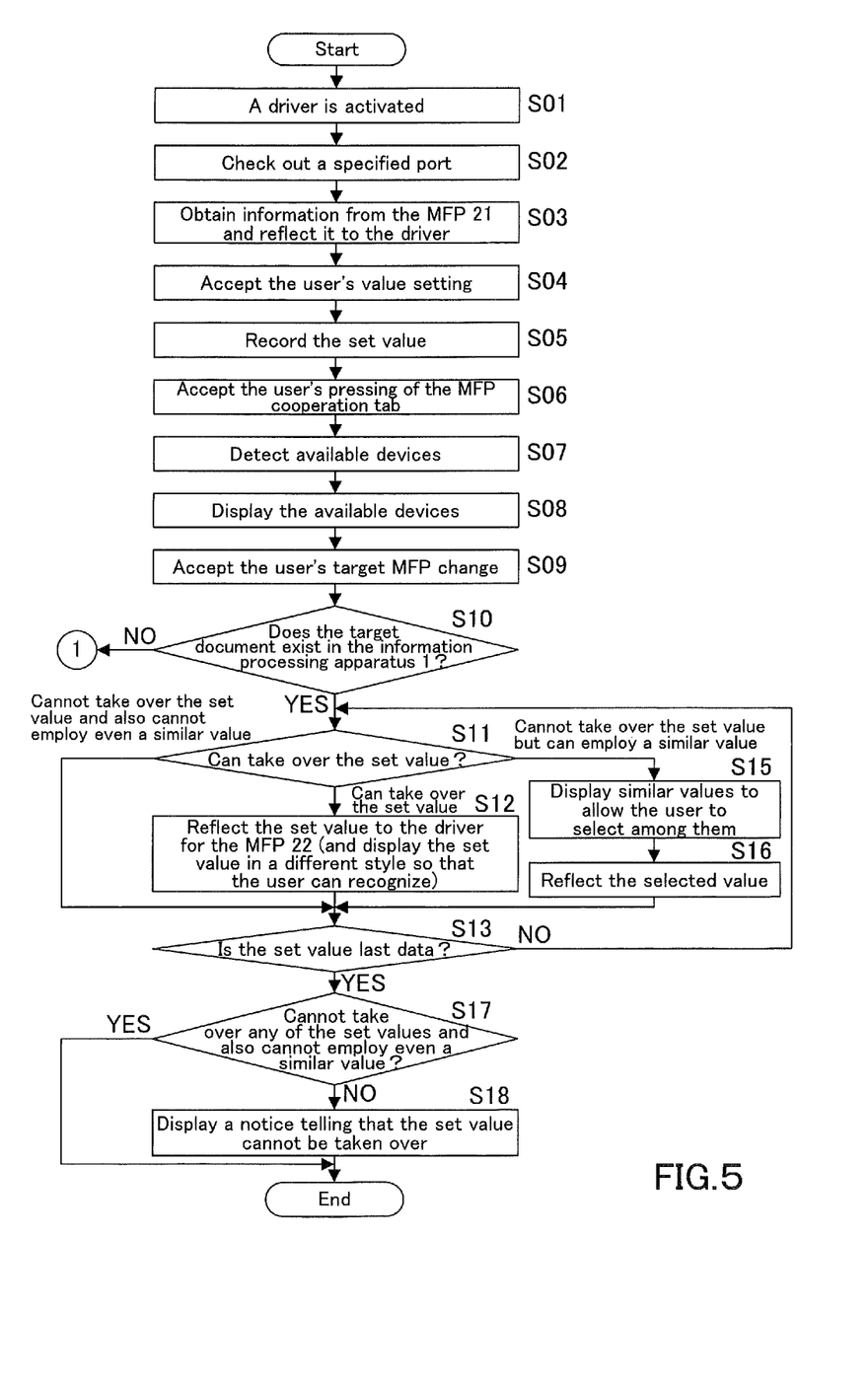
FIG. 5 is a flowchart representing a procedure executed in the information processing apparatus.
Figure 6:
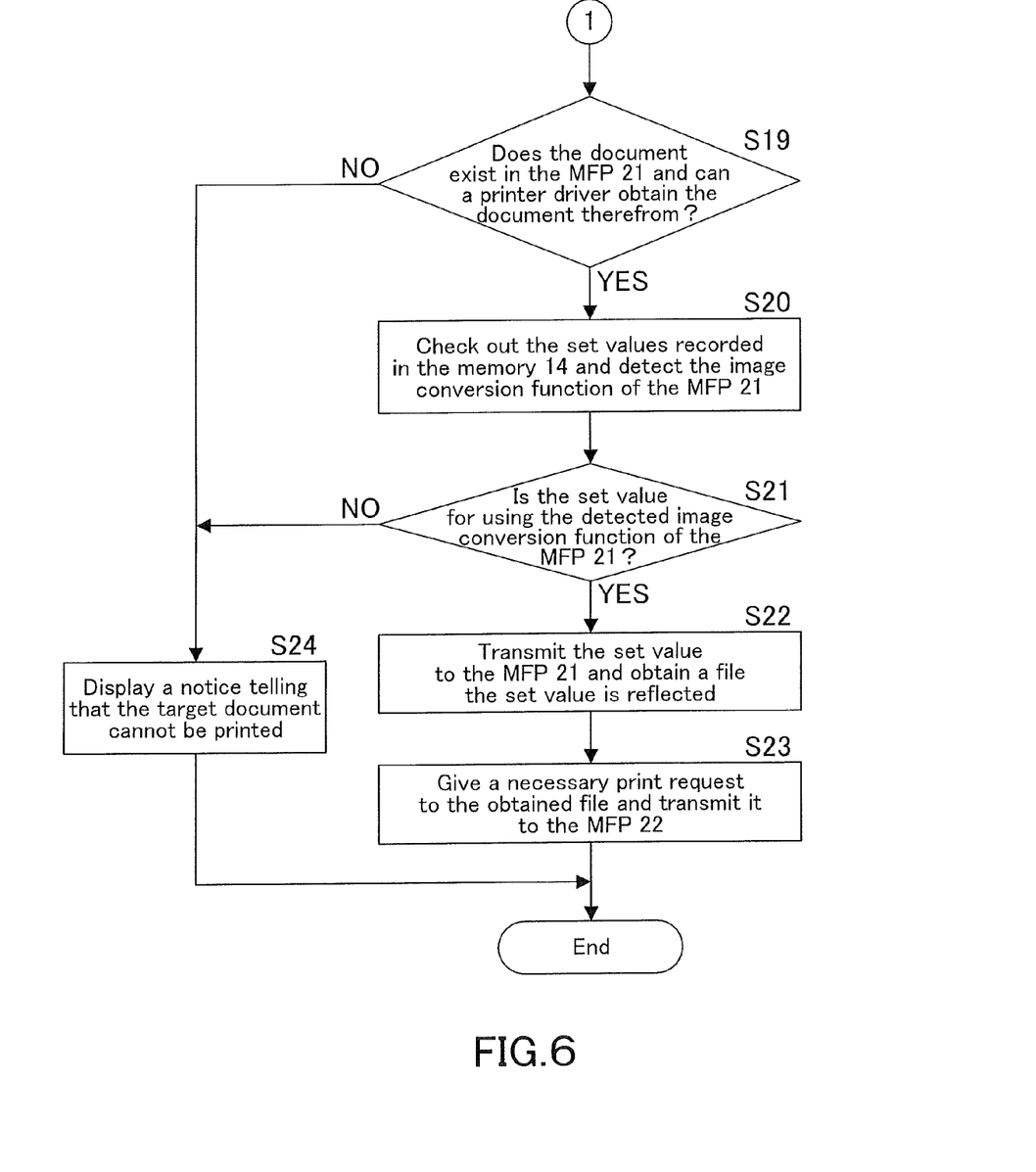
FIG. 6 is a flowchart continued from the flowchart of FIG. 5.

The flowchart of FIG. 5 and the other flowcharts of the Figures after FIG. 6 are executed by the CPU 11 of the information processing apparatus 1, according to a program such as a printer driver.

In Step S01 of FIG. 5, a printer driver for the MFP 21 for example, is activated according to a user instruction and a print setting screen is displayed on the display 16. Then in Step S02, a specified port is checked out.

Subsequently, information is obtained from the MFP 21 via the network 3 and reflected to the printer driver in Step S03. And a value set by a user via the print setting screen is accepted in Step S04, and the set value is recorded in the memory 14 in Step S05.

To change the target printer from the MFP 21 to a different MFP, the user presses the MFP cooperation tab 51 (shown in FIG. 1). Then, this operation is accepted in Step S06, and available devices are detected in Step S07, and then the detected available devices are displayed in a device selection screen in Step S08.

For example, the user selects the MFP 22 via the device selection screen. Then, this operation is accepted in Step S09. And in Step S10, the storage location of the data that the user is trying to print out is checked out and it is judged whether or not the target document exists in the information processing apparatus 1. If it does not exist in the information processing apparatus 1 (NO in Step S10), the routine proceeds to Step S19 of FIG. 6.

If it exists in the information processing apparatus 1 (YES in Step S10), then it is judged in Step S11, whether or not the printer driver for the MFP 22 can take over the one value set using the printer driver for the MFP 21.

If the printer driver for the MFP 22 can take over the set value ("can take over the set value" in Step S11), then in Step S12, the set value is reflected to the printer driver for the MFP 22 and displayed in a different style, for example in a different color or size, in the operation setting screen, so that the user can recognize that the set value is taken over. And then, the routine proceeds to Step S13.

If the printer driver for the MFP 22 cannot take over the set value but can employ a value similar to the set value ("cannot take over the set value but can employ a similar value" in Step S11), the routine proceeds to Step S15, in which values similar to the set value are displayed on the display 16 so as to allow the user to select any of them. Alternatively, the printer driver may automatically suggest similar values so as to allow the user to select any of them. And a similar value selected by the user is reflected to the printer driver in Step S16, then the routine proceeds to Step S13.

As described above, values similar to the set value that cannot be taken over, are displayed on the display 16 so as to allow users to select any of the similar values. Thus, users can easily set a value similar to the set value and this is convenient.

If the printer driver for the MFP 22 cannot take over the set value and also cannot employ even a value similar to the set value ("cannot take over the set value and also cannot employ a similar value" in Step S11), the routine directly proceeds to Step S13.

In Step S13, it is judged whether or not the set value is the last data of all. If it is not the last data (NO in Step S13), the routine goes back to Step S11 to judge whether or not the printer driver can take over the following set value. If it is the last data (YES in Step S13), then it is judged in Step S17, whether or not the printer driver cannot take over any of the set values and also cannot employ even a similar value. If the printer driver can take over at least one of the set values or can employ a similar value (YES in Step S17), the routine immediately terminates. If the printer driver cannot take over any of the set values and also cannot employ even a similar value (NO in Step S17), a notice telling that the set value cannot be taken over is displayed on the display 16 so that the user can recognize in Step S18, and then the routine terminates.

In Step S19 of FIG. 6, it is judged whether or not the target document exists in the MFP 21 and the printer driver has a function to obtain a document from the MFP 21. If the target document does not exist in the MFP 21, or the target document does exist in the MFP 21 but the printer driver does not have such a function (NO in Step S19), a notice telling that the target document cannot be printed is displayed on the display 16 so that the user can recognize in Step S24. Alternatively, such a notice may be transmitted by electronic mail or etc.

If the target document exists in the MFP 21 and the printer driver has a function to obtain a document from the MFP 21 (YES in Step S19), the set values recorded in the memory 14 are checked out and the image conversion function of the MFP 21 is detected in Step S20.

And in Step S21, it is judged whether or not the set value is for using the detected image conversion function of the MFP 21. If it is not (NO in Step S21), a notice telling that the target document cannot be printed is displayed on the display 16 in Step S24.

If it is for using (YES in Step S21), then in Step S22, the set value is transmitted to the MFP 21, and a file that the set value is reflected is created by the MFP 21 and obtained from the MFP 21. After that, in Step S23, a necessary print request is given to the file obtained from the MFP 21 and transmitted to the MFP 22.

Figure 7:
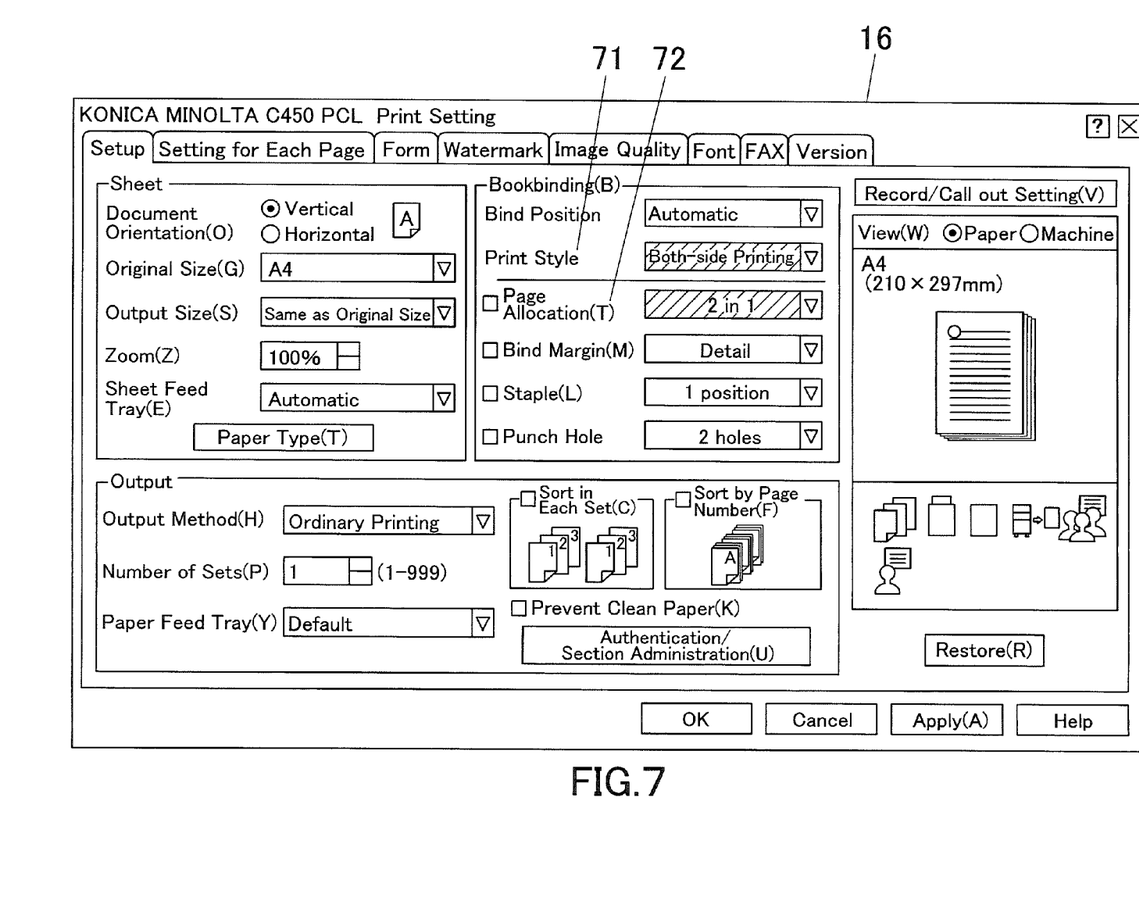
FIG. 7 is a view showing an operation setting screen displayed according to a device driver for a first device that is before changing, on a display of the information processing apparatus.

FIG. 7 is a view showing an operation setting screen displayed on the display 16, according to a printer driver for the MFP 21 that is before changing. In this example, values that are not default ones are set for the setting items 71 and 72, "print style" and "page allocation".

Figure 8:
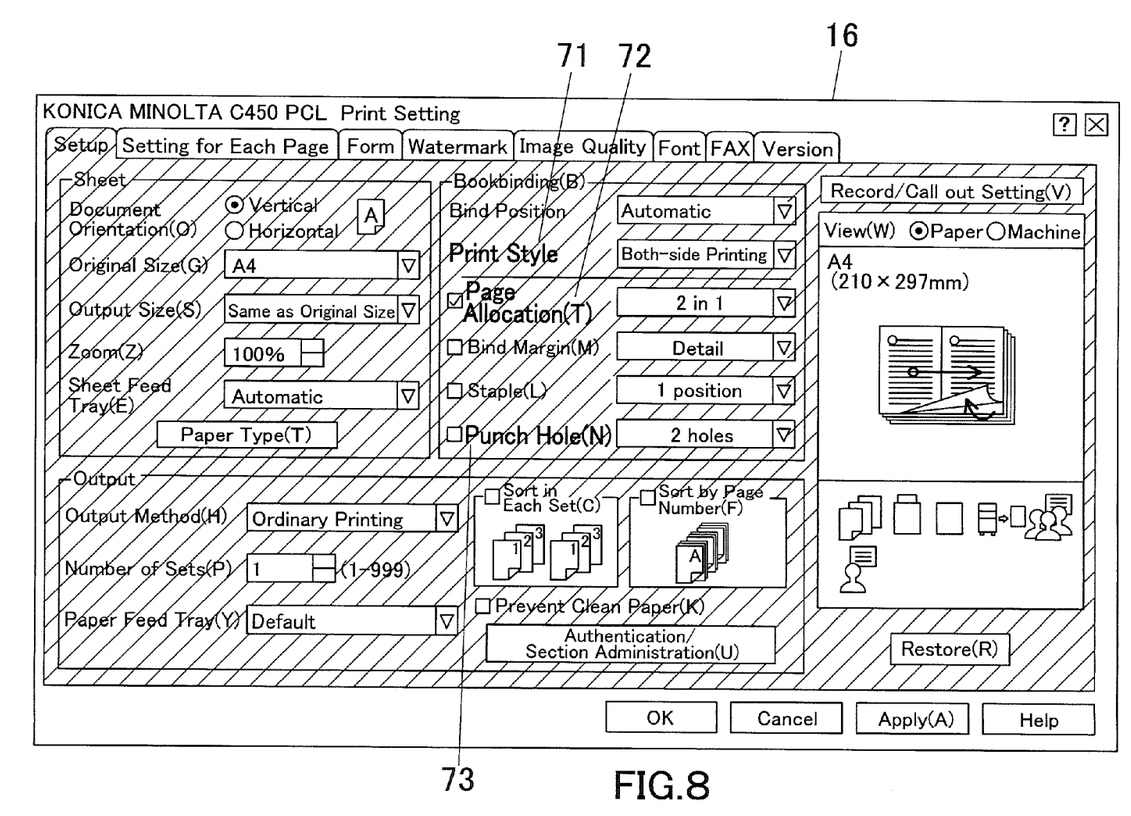
FIG. 8 is a view showing an operation setting screen displayed according to a device driver for a second device that is after changing, on a display of the information processing apparatus.

FIG. 8 is a view showing an operation setting screen displayed on the display 16, according to a printer driver for the MFP 22 that is after changing. In this example, the MFPs 21 and 22 are products made by the same manufacturer and their printer drivers' user interfaces are common.

In the operation setting screen of FIG. 8, the value set for a setting item via an operation setting screen displayed according to a printer driver for the MFP 21 is displayed in a display style different from other setting items, thus it is understood that the set value is taken over. In this example of FIG. 8, the values set for the setting items 71 and 72, "print style" and "page allocation", are displayed in a display style different from other setting items, thus users can recognize that a printer driver for the MFP 22 takes over the values set using the printer driver for the MFP 21.

The set value may be displayed in a different size, font or color, for example.

Furthermore, in this embodiment, if there is a difference in functions between the MFPs 21 and 22, a setting item that corresponds to the different function is displayed in a display style different from other setting items, for example with a light shade of gray, so that users can recognize. In FIG. 8, as an example of a setting item that corresponds to the different function, "punch hole", the setting item 73, is displayed with a light shade of gray.

Also as indicated by shadow in FIG. 8, the tab related to the set value taken over, in other words, the tab related to a value that is not default one, is displayed in a different display style, for example in a different color, so that users can recognize.

Figure 9:
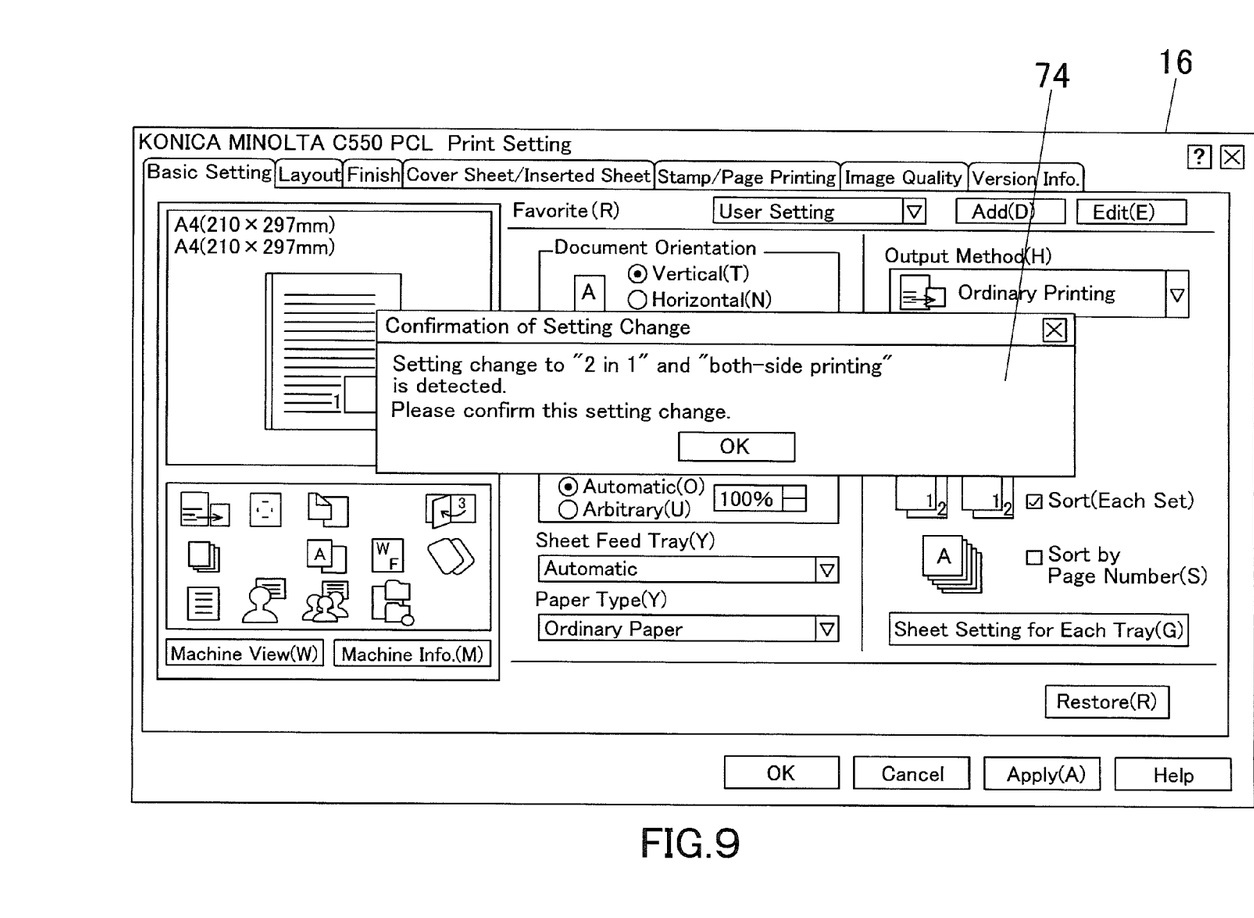
FIG. 9 is a view showing another operation setting screen displayed according to a device driver for the second device, with a pop-up window containing a notice telling that the set value is taken over.

If the MFPs 21 and 22 are not products made by the same manufacturer and their printer drivers' user interfaces are not common, a changed function or a difference in functions are displayed in a pop-up window 74 or etc., as shown in FIG. 9, so that users can recognize.

Figure 10:
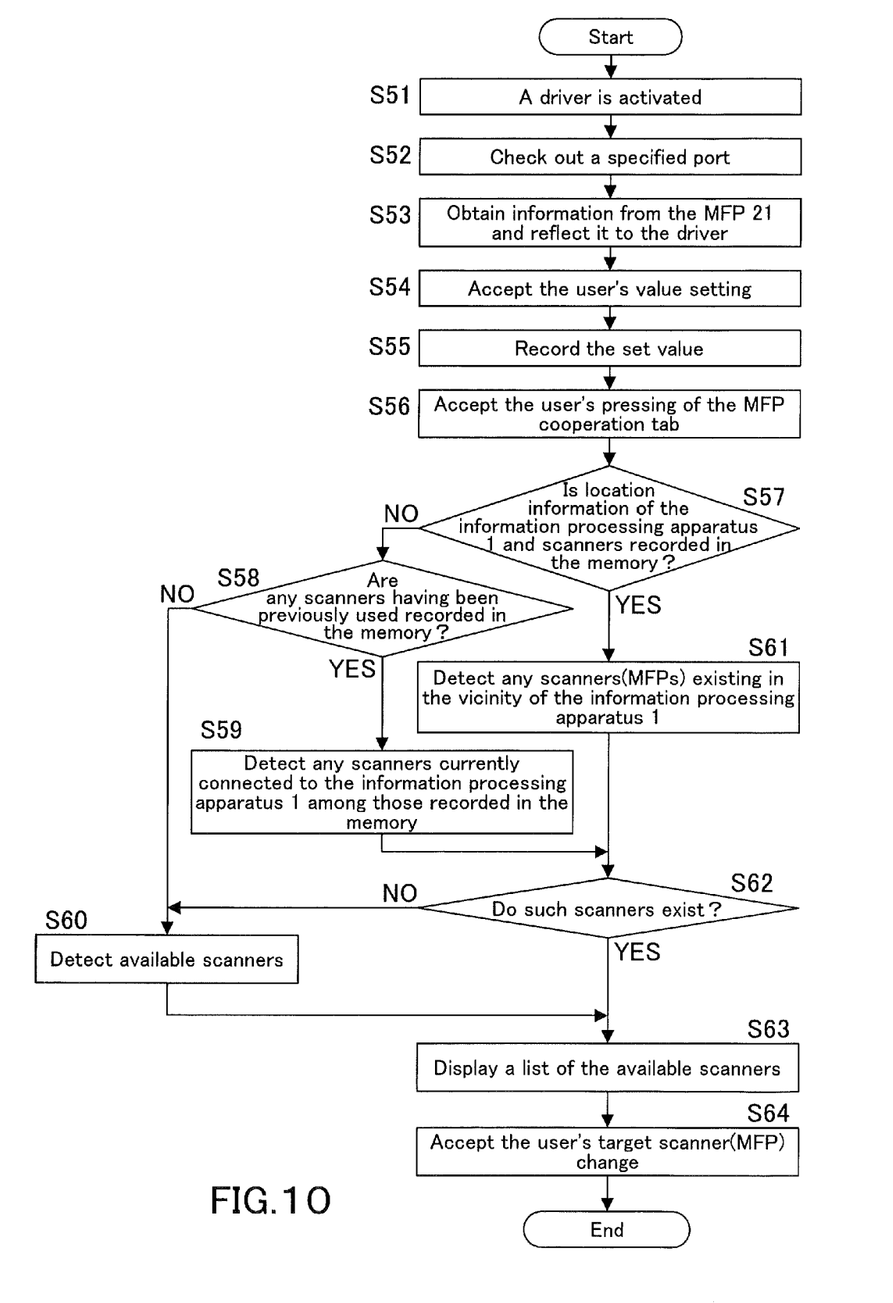
FIG. 10 is a flowchart representing a procedure executed in the information processing apparatus in another embodiment of the present invention.

FIG. 10 shows another embodiment of the present invention. In this embodiment, if the device driver for the MFP 21 is a real-time scanner driver that loads data scanned by the scanner 213 of the MFP 21, the information processing apparatus 1 limits available scanners (MFPs) to the ones existing in the vicinity of the information processing apparatus 1, for example. If there exist no scanners in the vicinity thereof, the information processing apparatus 1 limits available scanners to the ones having been previously used. If a user who operates the information processing apparatus 1 uses a scanner of a MFP existing away from the information processing apparatus 1, it would take time for the user to go to this scanner, set a document thereon and finish reading the document, and during that time, a third person is prohibited from using the scanner. To prevent this inconvenience, the information processing apparatus 1 limits available scanners (MFPs).

In Step S51, a driver for the scanner 213 of the MFP 21 for example, is activated according to a user instruction and an operation setting screen is displayed on the display 16. Then in Step S52, a specified port is checked out.

Subsequently, information is obtained from the MFP 21 via the network 3 and reflected to the driver in Step S53. And a value set by a user via the operation setting screen is accepted in Step S54, and the set value is recorded in the memory 14 in Step S55.

To change the target scanner from the scanner 213 of the MFP 21 to a scanner 213 of a different MFP, the user presses the MFP cooperation tab 51 (shown in FIG. 1). Then, this operation is accepted in Step S56, and it is judged in Step S57, whether or not location information of the information processing apparatus 1 and scanners (MFPs) is recorded in the information processing apparatus 1.

If the location information is recorded therein (YES in Step S57), any scanners (MFPs) existing in the vicinity of the information processing apparatus 1 are detected in Step S61, and then the routine proceeds to Step S62.

In Step S57, if the location information is not recorded therein (NO in Step S57), then it is judged in Step S58, whether or not any scanners having been previously used by the user are recorded. If these are recorded (YES in Step S58), any scanners currently connected to the information processing apparatus 1 are detected among those recorded in the information processing apparatus 1 in Step S59, and then the routine proceeds to Step S62. In Step S58, if no scanners having been previously used by the user are recorded (NO in Step S58), the routine proceeds to Step S60.

In Step S62, it is judged whether or not any scanners (MFPs) exist in the vicinity of the information processing apparatus 1, or whether or not any scanners (MFPs) currently connected to the information processing apparatus 1, having been previously used by the user are recorded. If any such scanners exist or are recorded (YES in Step S62), the routine proceeds to Step S63. If no such scanners exist or are recorded (NO in Step S62), the routine proceeds to Step S60.

Available scanners are detected in Step S60, and the routine proceeds to Step S63.

In Step S63, a list of the available scanners (MFPs) is displayed on the display 16. Then, a scanner (MFP) selected by the user is accepted in Step S64.

After accepting the user's operation, the processes previously explained in Steps S11, S12, S13, S15 and S16 of FIG. 5 are executed.

Figure 11:
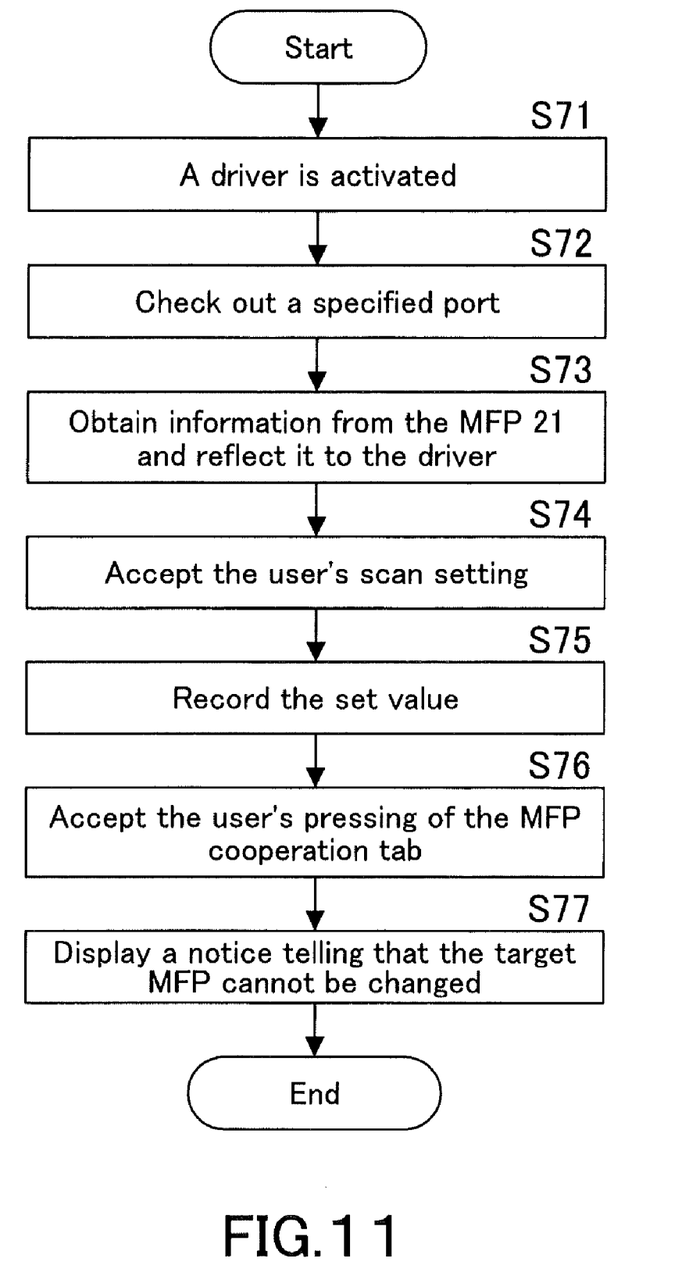
FIG. 11 is a flowchart representing a procedure executed in the information processing apparatus in yet another embodiment of the present invention.

FIG. 11 relates to yet another embodiment of the present invention. In this embodiment, if the device driver for the MFP 21 is a scanner driver that obtains scan data recorded in the memory 216 such as a hard disk drive of the MFP 21, the user is prohibited from changing the target device to a different device.

In Step S71, a driver for the scanner 213 of the MFP 21 for example, is activated according to a user instruction and an operation setting screen is displayed on the display 16. Then in Step S72, a specified port is checked out.

Subsequently, information is obtained from the MFP 21 via the network 3 and reflected to the driver in Step S73. And values set for "scan setting" by a user via the operation setting screen are accepted in Step S74, and the set values are recorded in the memory 14 in Step S75.

To change the target scanner from the scanner 213 of the MFP 21 to a scanner of a different MFP, the user presses the MFP cooperation tab 51 (shown in FIG. 1). Then, this operation is accepted in Step S76, and a notice telling that the target scanner (MFP) cannot be changed to a different scanner (MFP) is displayed on the display 16 in Step S77.

Each described above is one embodiment of the present invention, but the present invention is not limited to these embodiments. For example, in these embodiments, the device drivers are printer drivers for the MFPs 21 and 22, or scanner drivers for the scanners 213 of the MFPs 21 and 22. Alternatively, the device drivers may be yet other ones.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An information processing apparatus having a first device driver and a second device driver installed thereon to use a first device and a second device, respectively, comprising:
   a display portion that displays on itself, an operation setting screen to perform operation setting for the first device, when the first device driver is activated;
   a memory that records in itself, a value set via the operation setting screen displayed on the display portion; and
   a controller that makes the second device driver for the second device, take over the value recorded in the memory and set using the first device driver, if a user changes the target device from the first device to the second device while performs operation setting via the operation setting screen, wherein:
   if a document is recorded in the first device and the second device driver cannot take over the value set using the first device driver, the controller transmits to the user, a notice telling that the second device cannot take over the set value.

2. The information processing apparatus recited in claim 1, wherein:
   if the second device driver cannot take over the value set using the first device driver, the controller makes the display portion display values similar to the set value so as to allow the user to select any of them.

3. An information processing apparatus having a first device driver and a second device driver installed thereon to use a first device and a second device, respectively, comprising:
   a display portion that displays on itself, an operation setting screen to perform operation setting for the first device, when the first device driver is activated;
   a memory that records in itself, a value set via the operation setting screen displayed on the display portion; and
   a controller that makes the second device driver for the second device, take over the value recorded in the memory and set using the first device driver, if a user changes the target device from the first device to the second device while performs operation setting via the operation setting screen, wherein:
   if a document is recorded in the first device and the second device driver can take over the value set using the first device driver, the controller obtains the document from the first device.

4. The information processing apparatus recited in claim 3, wherein:
   the controller makes the display portion display the set value taken over by the second device driver in an operation setting screen displayed according to the second device driver so that user can recognize.

5. The information processing apparatus recited in claim 3, wherein:
   if there is a difference in configurable functions between the first device and the second device, the controller makes the display portion display the difference in an operation setting screen displayed according to the second device driver so that user can recognize.

6. The information processing apparatus recited in claim 3, wherein:
   if the target device is changed from the first device to the second device, the controller detects available devices and makes the display portion display the detected available devices.

7. An information processing having a first device driver and a second device driver installed thereon to use a first device and a second device, respectively, comprising:
   a display portion that displays on itself, an operation setting screen to perform operation setting for the first device, when the first device driver is activated;
   a memory that records in itself, a value set via the operation setting screen displayed on the display portion; and
   a controller that makes the second device driver for the second device, take over the value recorded in the memory and set using the first device driver, if a user changes the target device from the first device to the second device while performs operation setting via the operation setting screen, wherein
   if the target device is changed from the first device to the second device, the controller detects available devices and makes the display portion display the detected available devices, and
   if the first device driver is a real-time scanner driver that loads data scanned by a scanner of the first device, the controller limits the available devices.

8. An information processing having a first device driver and a second device driver installed thereon to use a first device and a second device, respectively, comprising:
   a display portion that displays on itself, an operation setting screen to perform operation setting for the first device, when the first device driver is activated;
   a memory that records in itself, a value set via the operation setting screen displayed on the display portion; and
   a controller that makes the second device driver for the second device, take over the value recorded in the memory and set using the first device driver, if a user changes the target device from the first device to the second device while performs operation setting via the operation setting screen, wherein if the target device is changed from the first device to the second device, the controller detects available devices and makes the display portion display the detected available devices, and
   if the first device driver is a scanner driver that obtains scan data recorded in a memory area of the first device, the controller prohibits the user from changing the first device to the second device.

9. A device operation setting method implemented by an information processing apparatus having a first device driver and a second device driver installed thereon to use a first device and a second device, respectively, comprising:
   displaying on a display portion, an operation setting screen to perform operation setting for the first device, when the first device driver is activated;
   recording in a memory, a value set via the operation setting screen displayed on the display portion;
   making the second device driver for the second device, take over the value recorded in the memory and set using the first device driver, if a user changes the target device from the first device to the second device while performs operation setting via the operation setting screen; and
   transmitting to the user, a notice telling that the second device driver cannot take over the set using the first device driver, if a document is recorded in the first device and the second device driver cannot take over the set value.

10. The device operation setting method recited in claim 9, wherein:
if the second device driver cannot take over the value set using the first device driver, values similar to the set value are displayed on the display portion so as to allow the user to select any of them.

11. A device operation setting method implemented by an information processing apparatus having a first device driver and a second device driver installed thereon to use a first device and a second device, respectively, comprising:
displaying on a display portion, an operation setting screen to perform operation setting for the first device, when the first device driver is activated;
recording in a memory, a value set via the operation setting screen displayed on the display portion; and
making the second device driver for the second device, take over the value recorded in the memory and set using the first device driver, if a user changes the target device from the first device to the second device while performs operation setting via the operation setting screen; wherein:
if a document is recorded in the first device and the second device driver can take over the value set using the first device driver, the document is obtained from the first device.

12. The device operation setting method recited in claim 11, wherein:
the set value taken over by the second device driver is displayed in an operation setting screen displayed on the display portion according to the second device driver so that user can recognize.

13. The device operation setting method recited in claim 11, wherein:
if there is a difference in configurable functions between the first device and the second device, the difference is displayed in an operation setting screen displayed on the display portion according to the second device driver so that user can recognize.

14. The device operation setting method recited in claim 11, wherein:
if the target device is changed from the first device to the second device, available devices are detected and displayed on the display portion.

15. A device operation setting method implemented by an information processing apparatus having a first device driver and a second device driver installed thereon to use a first device and a second device, respectively, comprising:
displaying on a display portion, an operation setting screen to perform operation setting for the first device, when the first device driver is activated;
recording in a memory, a value set via the operation setting screen displayed on the display portion; and
making the second device driver for the second device, take over the value recorded in the memory and set using the first device driver, if a user changes the target device from the first device to the second device while performs operation setting via the operation setting screen;
wherein if the target device is changed from the first device to the second device, available devices are detected and displayed on the display portion; and
if the first device driver is a real-time scanner driver that loads data scanned by a scanner of the first device, the available devices are limited.

16. A device operation setting method implemented by an information processing apparatus having a first device driver and a second device driver installed thereon to use a first device and a second device, respectively, comprising:
displaying on a display portion, an operation setting screen to perform operation setting for the first device, when the first device driver is activated;
recording in a memory, a value set via the operation setting screen displayed on the display portion; and
making the second device driver for the second device, take over the value recorded in the memory and set using the first device driver, if a user changes the target device from the first device to the second device while performs operation setting via the operation setting screen;
wherein if the target device is changed from the first device to the second device, available devices are detected and displayed on the display portion; and
if the first device driver is a scanner driver that obtains scan data recorded in a memory area of the first device, the user is prohibited from changing the first device to the second device.

17. A non-transitory computer readable recording medium having a device operation setting program recorded therein to make a CPU of an information processing apparatus having a first device driver and a second device driver installed thereon to use a first device and a second device, respectively, execute:
displaying on a display portion, an operation setting screen to perform operation setting for the first device, when the first device driver is activated;
recording in a memory, a value set via the operation setting screen displayed on the display portion;
making the second device driver for the second device, take over the value recorded in the memory and set using the first device driver, if a user changes the target device from the first device to the second device while performs operation setting via the operation setting screen; and
transmitting to the user, a notice telling that the second device driver cannot take over the value set using the first device driver, if a document is recorded in the first device and the second device driver cannot take over the set value.

18. The non-transitory computer readable recording medium recited in claim 17, wherein:
if the second device driver cannot take over the value set using the first device driver, the program makes the CPU display value similar to the set value on the display portion so as to allow the user to select any of them.

19. A non-transitory computer readable recording medium having a device operation setting program recorded therein to make a CPU of an information processing apparatus having a first device driver and a second device driver installed thereon to use a first device and a second device, respectively, execute:
displaying on a display portion, an operation setting screen to perform operation setting for the first device, when the first device driver is activated;
recording in a memory, a value set via the operation setting screen displayed on the display portion; and
making the second device driver for the second device, take over the value recorded in the memory and set using the first device driver, if a user changes the target device from the first device to the second device while performs operation setting via the operation setting screen; wherein:
if a document is recorded in the first device and the second device driver can take over the value set using the first device driver, the program makes the CPU obtain the document from the first device.

20. The non-transitory computer readable recording medium recited in claim 19, wherein:
the program makes the CPU display the set value taken over by the second device driver in an operation setting screen displayed on the display portion according to the second device driver so that user can recognize.

21. The non-transitory computer readable recording medium recited in claim 19, wherein:
if there is a difference in configurable functions between the first device and the second device, the program makes the CPU display the difference in an operation setting screen displayed on the display portion according to the second device driver so that user can recognize.

22. The non-transitory computer readable recording medium recited in claim 19, wherein:
if the target device is changed from the first device to the second device, the program makes the CPU detect available devices and display the detected available devices on the display portion.

23. A non-transitory computer readable recording medium having a device operation setting program recorded therein to make a CPU of an information processing apparatus having a first device driver and a second device driver installed thereon to use a first device and a second device, respectively, execute:
displaying on a display portion, an operation setting screen to perform operation setting for the first device, when the first device driver is activated;
recording in a memory, a value set via the operation setting screen displayed on the display portion; and
making the second device driver for the second device, take over the value recorded in the memory and set using the first device driver, if a user changes the target device from the first device to the second device while performs operation setting via the operation setting screen; wherein
if the target device is changed from the first device to the second device, the program makes the CPU detect available devices and display the detected available devices on the display portion; and
if the first device driver is a real-time scanner driver that loads data scanner by a scanner of the first device, the program makes the CPU limit the available devices.

24. A non-transitory computer readable recording medium having a device operation setting program recorded therein to make a CPU of an information processing apparatus having a first device driver and a second device driver installed thereon to use a first device and a second device, respectively, execute:
displaying on a display portion, an operation setting screen to perform operation setting for the first device, when the first device driver is activated;
recording in a memory, a value set via the operation setting screen displayed on the display portion; and
making the second device driver for the second device, take over the value recorded in the memory and set using the first device driver, if a user changes the target device from the first device to the second device while performs operation setting via the operation setting screen; wherein
if the target device is changed from the first device to the second device, the program makes the CPU detect available devices and display the detected available devices on the display portion; and
if the first device driver is a scanner driver that obtains scan data recorded in a memory area of the first device, the program makes the CPU prohibit the user from changing the first device to the second device.

* * * * *